UNITED STATES PATENT OFFICE.

E. S. MURINGER, OF PHILADELPHIA, PENNSYLVANIA.

IMPROVED CONCENTRATED FOOD OR BEEF-TEA.

Specification forming part of Letters Patent No. 34,642, dated March 11, 1862.

*To all whom it may concern:*

Be it known that I, E. SALOMI MURINGER, of Philadelphia, in the county of Philadelphia and State of Pennsylvania, have invented a new and useful article which I call "Concentrated Food or Beef-Tea;" and I do hereby declare that the following is a full and exact description thereof and of the manner of preparing the same.

The nature of my invention consists in the production of an article of food which possesses in the most compact form possible all the substantial and nutritive properties contained in a large bulk of meat and vegetables. To this end I take the best fresh beef, wash it clean of blood, as far as possible, and soak it in cold water twenty-four hours, in the proportion of six pounds of beef to one gallon of water. I then boil it in the same water over a good fire twenty-four hours, or until it is boiled down to one-fourth the original quantity, and as it boils skim off and remove the fat. I also add, if desirable, vegetables in about the same proportions they are used in making beef-soup. I next clarify the preparation while hot by passing it through fine cloth, and when sufficiently cool cut it in pieces and dry them on net-work or thin open materials, as in drying glue, and the process is complete.

In using this article of food, to each cake of the extract pour on from a pint to a pint and a half of boiling water, according to the strength desired. In two minutes, or less, it will be entirely dissolved. Then add salt, pepper, and any other seasoning desired, and the soup is ready for consumption. The cakes are best kept in a dry cool place.

This article possesses in the most compact form possible all the substantial and nutritive properties contained in a large bulk of beef and vegetables. The readiness with which it dissolves into a rich and palatable soup—such as it would take hours of cooking to make direct from the beef—renders it in many situations of life invaluable. Being highly nourishing, as well as a light and delicate food, it is highly useful for the sick, while for those in health it is a perfect substitute for fresh beef and vegetables. It is peculiarly well calculated for the navy, where fresh beef and vegetables are difficult to obtain, even if at all, as on long voyages. For the army and for military hospitals it will be found an incalculable comfort and economy, rendering the transport of cattle needless. In short, there is no situation in life where this concentrated food will not be found of great value and convenience. The article is widely different from bouillon and all other similar preparations with which I am acquainted.

Having thus described my new article of food, the method of preparing it, and the manner in which it is used, what I claim therein, and desire to secure by Letters Patent of the United States, is—

The concentrated food or beef-tea above described, when prepared in the manner substantially as specified.

E. S. MURINGER.

Witnesses:
JOHN W. SHUGERT,
J. S. BROWN.